(12) United States Patent
Ben-Ze'ev et al.

(10) Patent No.: US 6,687,757 B1
(45) Date of Patent: Feb. 3, 2004

(54) PACKET PROCESSOR

(75) Inventors: Yuval Ben-Ze'ev, Tel Aviv (IL); Yossi Livshitz, Herzlia (IL); Raan Kahn, Genei Tikva (IL); Yeshayahu Mor, Herzlia (IL)

(73) Assignee: Flextronics Semiconductor Inc., Sunnyvale, CA (US)

( * ) Notice: Subject to any disclaimer, the term of this patent is extended or adjusted under 35 U.S.C. 154(b) by 685 days.

(21) Appl. No.: 09/598,163

(22) Filed: Jun. 21, 2000

(51) Int. Cl.$^7$ .............................................. G06F 15/16
(52) U.S. Cl. ....................................... 709/250; 709/249
(58) Field of Search ................................ 709/250, 249, 709/232, 233, 220, 227; 375/222

(56) References Cited

U.S. PATENT DOCUMENTS

| | | | |
|---|---|---|---|
| 6,216,171 B1 * | 4/2001 | Isono et al. ................... | 709/250 |
| 6,236,678 B1 * | 5/2001 | Horton, Jr. et al. .......... | 375/222 |
| 6,345,310 B1 * | 2/2002 | Allison et al. ............... | 709/250 |
| 6,351,773 B1 * | 2/2002 | Fijolek et al. ............... | 709/228 |
| 6,516,952 B1 * | 2/2003 | Wang et al. ................. | 209/227 |

FOREIGN PATENT DOCUMENTS

EP          789 468       1/1997

* cited by examiner

Primary Examiner—Zarni Maung
(74) Attorney, Agent, or Firm—Mark M. Friedman

(57) ABSTRACT

A Packet Processor for a communication apparatus, for processing received and transmitted data streams made of packets. Each packet includes a header and a payload section, which includes a receiving part, a transmitting part, a Backbone Bus for conveying management data, instructions and addresses between various components of the Packet Processor, and a timing and control unit for administering the operation of the Packet Processor, and for timing of using transmission slots for the transmit path. The receiving part includes a receiving PHY interface by which a flow of data stream is conveyed from a Modulator-Demodulator section of the modem to the Packet Processor. The receiving part further includes a receiving Tubular Bus which received the flow of data stream, conveyed from the modem to the Packet Processor, the receiving Tubular Bus conveys data, while processed, the direction from the receiving PHY interface to a host interface. The receiving part includes one or more processing units between sections of the first Tubular Bus for sequentially receiving portions of a data stream from a section of the Tubular Bus, processing it and outputting the processed data to a next section of the first Tubular Bus. The receiving part contains a FIFO storage unit before and a FIFO storage unit after any of the processing units on the receiving Tubular Bus, for providing a temporary storage for portions of the data stream, and a first host interface for receiving data from the receiving Tubular Bus and conveying it to a host. The transmitting part further includes a FIFO storage unit before and after any of the processing units on the second Tubular Bus, and a transmitting PHY interface for receiving processed data from the transmitting Tubular Bus and conveying it to a Modulator-Demodulator section.

36 Claims, 7 Drawing Sheets

PACKET PROCESSOR

FIELD OF THE INVENTION

The invention generally relates to broadband communication systems for conveying digital data. More particularly, the invention relates to a programmable, general purpose Packet Processor, which can be used, for example, as a Media Access Control module for modems.

BACKGROUND OF THE INVENTION

The recent development of the Internet, and the development of computer systems directed towards working in wide and global networks have significantly increased the use of modems. Modems for broad band communication are now required to deal with a very high rate of data transfer in a variety of environments.

In the previous decade, modems were mostly used for transferring digital data over a telephone line. In today's communication systems, complex modems are also used for conveying data over other types of mediums, for example, over TV cables, or satellite links. Wireless and/or broad band modems are used, for example, in mobile communications, e.g., for communicating with cells or satellites, etc. Routers, which are widely used in networks, are also an example for such application.

The rapid development of modems for these and other purposes, and the fast and frequent increase in the data transfer rate have increased the necessity to frequently develop and define new standards and protocols for communications. The frequent introduction of new standards, and the increase in the transfer rate have generally required the replacement of older standards, by those compatible with the new standards, as the older modems could not comply with the newer standards, could not adapt to the change in the data transfer rate, or could not be reconfigured.

Generally, any modem comprises two main sections. The first section, the modulator-demodulator section, is a mixed signal section for interfacing between the modem and the medium of transfer, for example, a telephone line, TV cable, or the air, in the case of a wireless modem (hereinafter, when the term "modulator-demodulator" is used, it should be understood to refer to the above-indicated section of the whole apparatus called modem. When the term "modem" is used, it should be understood to refer to the whole apparatus commonly called modem).

The second section of any modem is digital, generally referred to as the Media Access Control (MAC) module. The MAC module operates in the Media Access Control layer. The purpose of the MAC module is to manage and handle the transfer of digital data between the modulator-demodulator section of the modem and a host, in which the higher level layers are implemented, is generally located external to the modem casing, and vice versa.

The MAC module, is the heart of any modem. The MAC module receives a sequence of data stream from a host, creates packets of data that are then transmitted by the modulator, or receives such packets of data from the demodulator and creates a data sequence from them. Of course, these packets also contain additional information which the two communicating modems may need for assuring a reliable communication, i.e., for enabling the recovery of the data at the receiving end. More particularly, the Media Access Control handles error correction, regulates the data flow, handles the handshaking between the two modems, and optionally encrypts or decrypts the transferred data, when necessary, etc. Other functions of the MAC module, when used e.g., in a modem for TV cables are, to carry out the synchronization with the CMTS (Cable Modem Termination System), to manage upstream transmission allocation mechanism, to operate transmission of data on time slot boundaries, and to filter the received headers from the received data. Of course, the MAC module should comply with certain predefined standards, in order to enable the modem to properly communicate both with other modems, and with the host.

Of course, it is essential for the MAC module to handle its tasks in a fast and reliable manner, as the performance of the whole modem greatly depends on the performance of this module. In the existing modems, particularly those working at a very high rate, for example, modems for conveying digital data over TV cables, or those for communicating over fiber-optic links, this is not an easy task, as the amount and rate of the data that the MAC module has to handle are very high.

Efforts have been made to use a processing unit for carrying out many of the tasks of the MAC module, however, with limited success. High speed packet processing poses serious challenges to a single general purpose processor. This is the main reason why many existing modems use hard-wired logic for some of the lower level tasks of the MAC layer, while a high speed processor, if such exists, takes control only at the packet level or IP (Internet Protocol) level. More particularly, in the existing modems the data is processed by a plurality of gates for carrying out the MAC and packet handling tasks. This configuration is rigid, and cannot be changed or reconfigured when a necessity arises.

EP 789,468 discloses an adapter for wireless networks which provides for reconfigurable media access control and data packet formats. However, this adapter is suitable for lower end wireless LAN, and not for high data rate modems, such cable TV or satellite modems.

It is therefore an object of the present invention to provide a Packet Processor for communications applications, particularly for modems, which is capable of handling a high rate of data and performing the above-mentioned tasks in an efficient manner. It is a particular object of the invention to provide a Packet Processor for the broadband and wide band communication schemes, which is capable of implementing functions that must be handled in real time. In one particular case, the Packet Processor is used as a MAC module of a modem.

It is another object of the invention to provide a structure for said Packet Processor, for enabling it to easily adopt new communication standards, and change of data rate, when necessary.

It is still another object of the invention to enable this Packet Processor to communicate with different types of peripherals. In a particular case when the Packet Processor is used as a MAC module for modem, an object of the invention to enable it to communicate with different types of PHY (modulator-demodulator) chips.

It is still another object of the invention to provide said MAC module in a structure which can be easily integrated in a single Very Large Scale Integration (VLSI) chip.

It is still another object of the invention to provide a general-purpose media Packet Processor, which can be used in other communications applications, and for various purposes, due to its programming characteristics.

Other objects and purposes of the invention will become apparent as the description proceeds.

SUMMARY OF THE INVENTION

The Packet Processor of the invention achieves these and other objects by providing to it a new structure.

The present invention relates to a Packet Processor for a communication apparatus, for processing received and transmitted data streams made of packets, each packet mainly comprises a header and a payload section, which comprises, (A) A receiving part comprising: (a) A receiving PHY interface by which a flow of data stream is conveyed from a Modulator-Demodulator section of a modem to the Packet Processor; (b) A receiving Tubular Bus receiving the said flow of data stream which is conveyed from the Modulator-Demodulator section of the modem to the Packet Processor, said receiving Tubular Bus conveying the data, while processed, in the direction from the said receiving PHY interface to a host interface; (c) At least one processing unit between sections of the said first Tubular Bus for sequentially receiving portions of a data stream from a section of the Tubular Bus processing the same, and outputting the processed data to a next section of the said first Tubular Bus; (d) One FIFO storage unit before and one FIFO storage unit after any of the said processing units on the receiving Tubular Bus, for providing a temporary storage for portions of the data stream; and (e) A first host interface for receiving data from the receiving Tubular Bus and conveying it to a host.

(B) A transmitting part comprising:
(a) A second host interface for receiving data from the host and conveying it to a second Tubular Bus; (b) A transmitting Tubular Bus for receiving the said flow of data stream which is conveyed from the host to the Packet Processor, said transmitting Tubular Bus conveying the data stream, while processed, in the direction from the said second host interface to a transmitting PHY interface; (c) At least one processing unit between sections of the said transmitting Tubular Bus, for sequentially receiving portions of the data stream from a section of the Tubular Bus, processing the same, and outputting the processed data to the next section of the said transmitting Tubular Bus; (d) One FIFO storage unit before and one FIFO storage unit after any of the said processing units on the second Tubular Bus, for providing a temporary storage for portions of the data stream; and (e) A transmitting PHY interface for receiving processed data from the transmitting Tubular Bus and conveying the same to a Modulator-Demodulator section.

(C) A Backbone Bus for conveying management data, instructions, and addresses between various components of the Packet Processor; and (D) Timing and control means for administering the operation of the Packet Processor, and particularly the timing of using transmission slots for the transmit path.

Each one of the processing units in the Packet Processor functions independently, but simultaneously, with the other processing units of the packet processor.

Preferably, the first and second host interfaces are fabricated within a same interface.

Preferably, the module comprises two processing units in the receiving part and two processing units in the transmitting part. In this case, in the receiving part, the processing unit closer to the demodulator handles the tasks of mainly processing the header, deframing the data stream, and detecting and correcting errors (CRC) in the header of the received data stream. The processing unit closer to the host, mainly handles the tasks of logical analysis, including, determining the length and type of the packets (management, or data), possible concatenation of packets etc., decrypting (DES) the received data stream, and error detecting and correcting of the data portion of the data stream. In the transmitting part, the processing unit closer to the host mainly handles the tasks of timing, controlling allocation, and prioritizing the transmission sequences, and activities related to the creation of the header CRC of the transmitted data stream. The processing unit closer to the modem mainly handles the task creation of the main CRC, encryption (DES), and framing of the transmitted data.

Preferably, each processing unit comprises a processor and a co-processor and an internal memory, which comprises an Instruction Cache memory and a Scratch Pad RAM.

Preferably, the packet processor of the invention also has a connection to an external memory unit. In that case, the communication with the external memory unit is made by a processing unit of the Packet Processor, via the Backbone Bus, and an external bus arbiter.

Preferably, the Packet Processor also has a connection to one or more external devices. One of said external devices is a storage unit, containing the application code for operating the Packet Processor, said application code being downloaded into the internal memory of each processing unit of the Packet Processor, and into said external memory unit when initializing the Packet Processor.

More preferably, the Packet Processor further comprises an External Bus for communication of the module with an external memory unit. In that case, the communication is made by a processing unit of the packet processor, via the External Bus, and an external bus arbiter.

Preferably, the Packet Processor further comprises a debugging unit for assisting in the debugging of the packet processor.

Preferably, the Packet Processor further comprises a DMA (Direct Memory Access) control unit for enabling internal transfer of data blocks between internal components of the Packet Processor, and transfer of data blocks between internal components of the Packet Processor and components external to the Packet Processor by means of the host interface.

The Packet Processor of the invention can be fabricated in a VLSI form.

Preferably, the Packet Processor of the invention further comprises a Serial Interface, preferably programmable, for carrying out communication of the Packet Processor with external serial components. Furthermore, it preferably comprises an Interrupt Central Unit (ICU) for handling interruptions to components in the Packet Processor.

The Packet Processor of the invention is particularly useful in modems, for example, a modem for TV cables. A particular use of the packet processor is as a Media Access Control for a modem for TV cables. However, it can also be used in many other communication applications, such as in wireless LANs, IP (Internet Protocol) telephones, or in routers of computer networks.

Preferably, each processing unit can send one or more macro-instruction, embedded with the data flowing in the tubular bus, said macro instruction flowing with the data stream over the tubular bus to a destination component downstream the tubular bus, and is used for controlling said component. A macro instruction may be provided, for example, to a FIFO, for flushing it, and for instructing it to ignore a portion of an incoming data, for example when an error is detected in the data, which cannot be corrected.

Preferably, the second FIFO downstream the receiving bus further has an associated address filter, said address filter which is used for comparing a destination address that is detected in the data stream with a list of addresses stored in said address filter, and according to the result of the comparison, a determination is made whether an operation should be taken or not on at least a portion of the data stream. Many different types of operations may be made based on said comparison, for example, an ignoring of a portion of the data stream.

Preferably, each of the said processing units is a RISC processor. More preferably, each processing unit is of the ARC type processor.

DETAILED DESCRIPTION OF PREFERRED EMBODIMENTS

The Packet Processor according to the invention comprises a plurality of processing units, in which tasks are distributed in an efficient way, thereby providing a Packet Processor that can function in an high rate environment, and which is programmable, thereby providing flexibility and adaptation to different types of environments, standards, protocols and purposes. The general structure of the Packet Processor of the invention is suitable, possibly with a few necessary modifications, for many communications applications, in modems, routers or others.

The specific examples given herein are particularly suitable for broad band modems, for example, modems for TV cables. Such modems are now working mostly according to the following standards: MCNS (Multimedia Cable Network System)/DOCSIS (Data Over Cable System Interface Specifications), DVB (Digital Video Broadcast/DAVIC (Digital Audio Video Council), and IEEE802.14 (IEEE's Cable TV MAC and physical Protocol Working Group).

Figure 1:
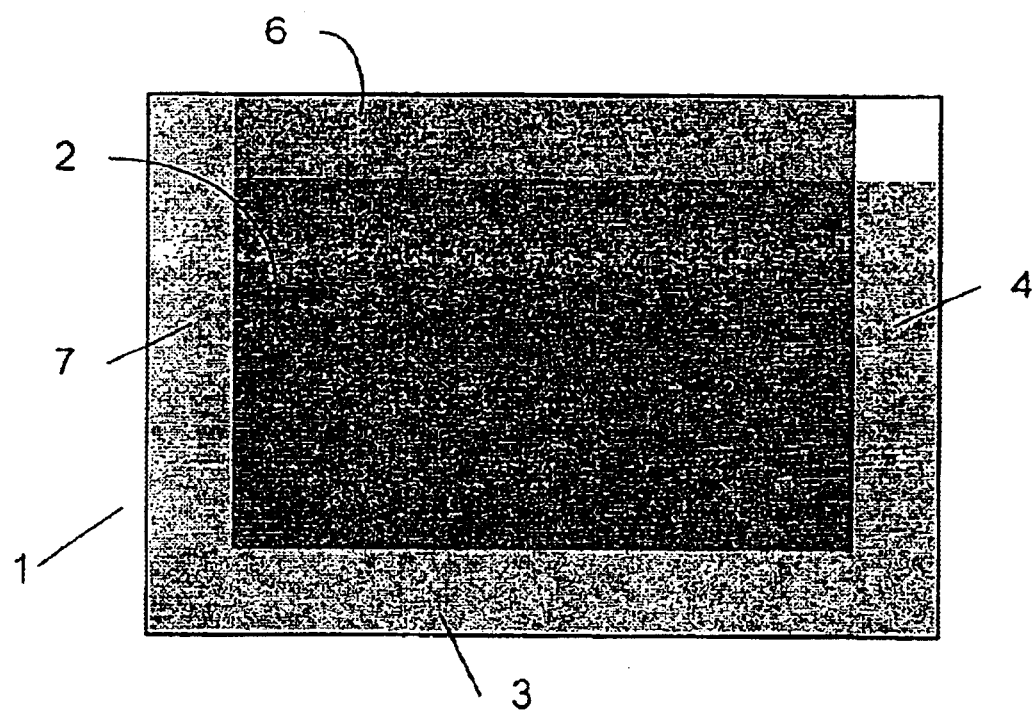
FIG. 1 is a scheme showing the input/output buses of the packet processor of the invention.

FIG. 1 illustrates a basic structure of the Packet Processor, according to one embodiment of the invention. The Packet Processor 1 is a Field Programmable Processors Array (FPPA) having four main interfaces for communicating with other devices and components outside the Packet Processor.

The processor array 2 includes plurality of processors, their associated coprocessors, and buses. The structure of the processor array will be elaborated in more detail hereinafter.

A host interface 3 connects the Packet Processor to a host. The host is generally a computer, a CPU, or another processing or calculating device which, in addition to the performance of other functions, is the source or the destination of a data stream that is transmitted or received by the modem.

A general purpose interface 7 connects the Packet Processor with components such as, for example, a keyboard, a debugging processor, a tuner, flush memory, etc. The General Purpose Bus 7 is a relatively slow bus, as it is generally used for "servicing" the processor.

The External Bus Interface 4 connects the plurality of processing units of the Packet Processor with a main memory unit, or optionally with other components on the board of the modem, etc. According to a preferred embodiment of the invention, the main memory unit is external to the Packet Processor, and each processing unit comprises an internal Instruction Cache (Icache) containing a portion of the code needed for its operation. When there is a miss in any of the said Icaches, a transfer of the missing code is transferred to the relevant internal cache via the External Bus Interface 4.

The PHY (physical) interface 6 connects the Packet Processor with the modulator-demodulator section of the modem. Through the PHY interface 6 a data stream is conveyed from the Packet Processor to the modulator for transmission, and a data stream is received at the Packet Processor from the demodulator. The PHY interface 6 is generally a programmable state machine, which is implemented, e.g., by RAM cells.

Figure 2:
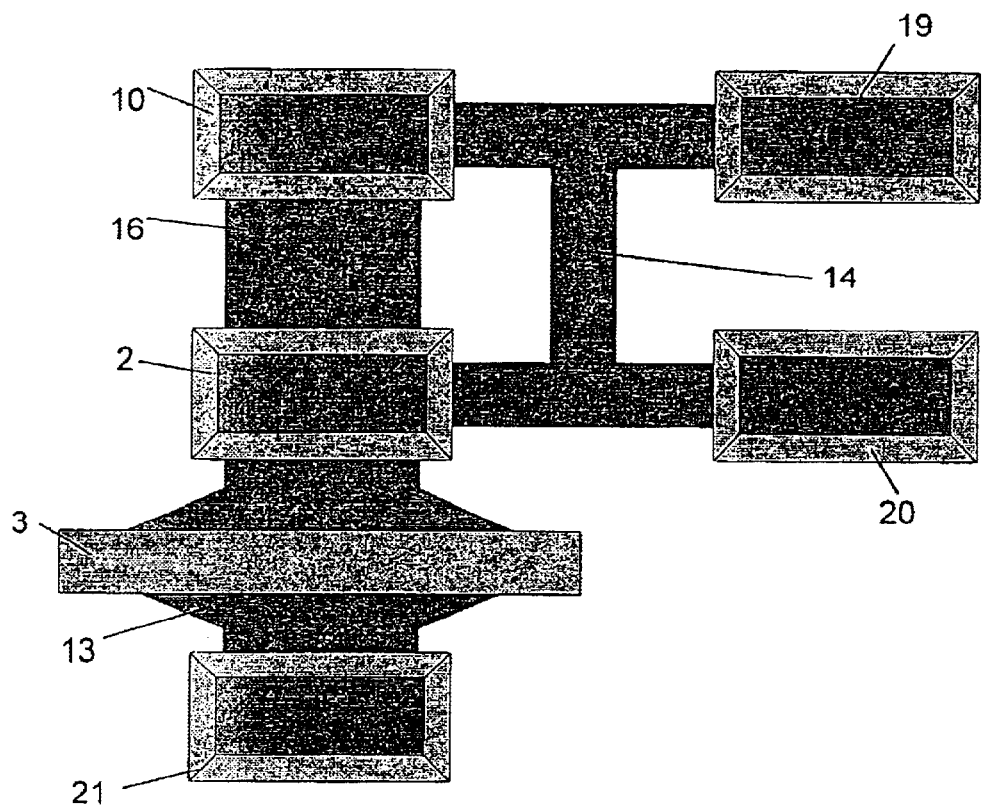
FIG. 2 is a more expanded scheme of FIG. 1, showing the input/output buses of the packet processor, together with some components in the periphery of the packet processor.

FIG. 2 depicts in more detail the environment of a Packet Processor according to one embodiment of the invention, and its connections with external components or devices. Numeral 2 indicates the Packet Processor. The PHY bus 16 connects the Packet Processor with the modulator-demodulator section 10 of the modem, generally a transceiver, which operates in the physical layer. The External bus 14 connects the Packet Processor 2 with the external memory unit 19, and optionally with additional external components, indicated as numeral 20. The Packet Processor 2 communicates with the host 21 via the host interface 3 and the bus 13. Bus 13 can be, for example, PCI, Internet, USB, FireWire, etc. Hereinafter, if not otherwise specifically indicated, the term "received data" refers to the data that is conveyed to the Packet Processor 2 from the modulator-demodulator unit of the modem. The modulator-demodulator 10 receives modulated data from the medium of transfer, demodulates it, and transfers it in a form of a bit octet stream to the Packet Processor. In the particular case when the Packet Processor is used as a MAC module of a TV cable modem, the modulator-demodulator 10 receives the modulated data from the cable network. In that particular case the data is typically originated from a CMTS (Cable Modem Termination System). The term "transmitted data" refers herein to the data that is conveyed to the Packet Processor 2 from a host, and, after being processed by the Packet Processor 2, the processed data is transferred to the modulator-demodulator section 10 of the modem, which in turn modulates it with a carrier, and transmits the modulated data to another modem over a medium of transfer. In the particular case when the Packet Processor 2 is used as a NIAC module of a TV cable modem, the modulated data is transmitted to the cable network, where it typically reaches a CMTS.

Figure 3:
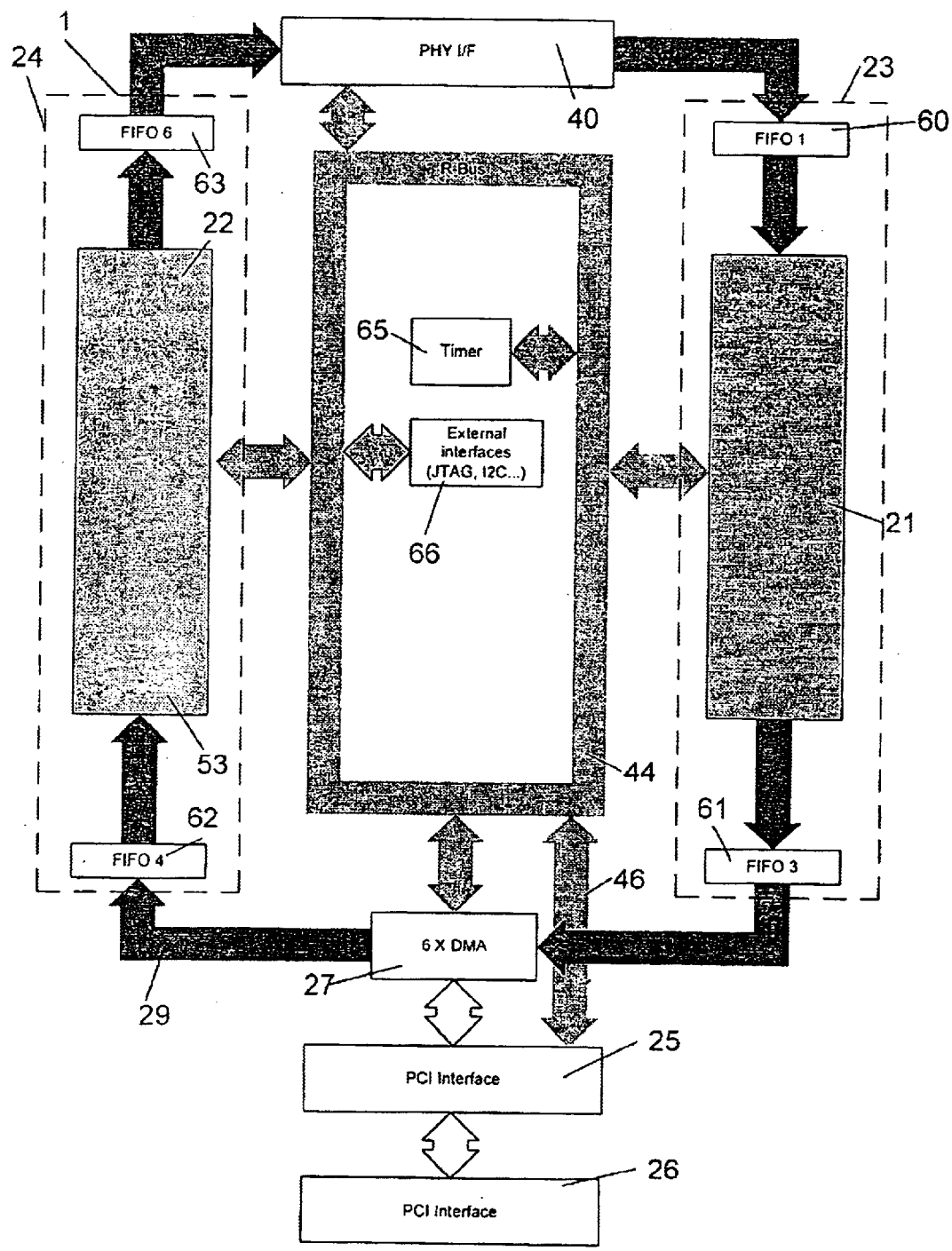
FIG. 3 shows a basic structure of a packet processor, according to one embodiment of the invention.

A basic structure of the Packet Processor according to one embodiment of the invention is shown in FIG. 3. The Packet Processor 1 comprises mainly two separate parts, a first part 23 for handling the flow of received data (hereinafter, this will be referred to as the "receiving part"), and a second part 24 (hereinafter, the "transmitting part") for handling the flow of the transmitted data. Each of the said two parts mainly comprises at least one processing-unit, and preferably at least two processing-units. Data from the host 26 is provided to the Packet Processor through the PCI interface 25. This data is then conveyed over the Tubular Bus 29 to the processing-unit/s of the transmitting part 24. This processing-unit frames the data, and combines with it some additional information, such as additional bits for enabling data error detection and correction (e.g., CRC—Cyclic Redundancy Check). The said processing-unit/s 22 of the transmitting part further organizes the data in packets that are then optionally encrypted, conveyed over the Tubular Bus 29 to the PHY (Physical) Interface 40, and from it, at an appropriate timing slots, to the modulator for transmission. Digital data that is received from the demodulator is conveyed through the PHY interface 40, and over the Tubular Bus 29 to the receiving processing-unit/s 21. The receiving processing-unit/s 21 deframes the received data, detects and corrects errors by processing the error correction data associated with the received data, and decrypts the data, when necessary. The deframed data is then conveyed to the PCI interface 25, and from it to its destination, the host processor. 26. A second bus, the Ring Bus 44, is actually a "management" bus of the Packet Processor. Through the Ring Bus 44 the receiving and the transmitting processing-units, 23 and 24 respectively, communicate with other components in the Packet Processor, or with external components, and over this bus data, addresses or instructions flow between the Packet Processor components. For example, via the Ring Bus 44 the code of the Packet Processor is downloaded from an external data storage, e.g., a diskette, a flush memory/EPROM, or a CD ROM to the memory unit of the modem (the main memory unit by itself is external of the Packet Processor and is not shown in FIG. 3). Furthermore, the Ring Bus 44 may optionally be used for enabling communication of the Packet Processor with a keyboard, with a debugging unit, or with other different units or devices external to the Packet Processor. Furthermore, communication may be carried out from the host processor 26, to the Ring Bus 44 via the PCI interface and the extension to the Ring Bus 46, and from the Ring Bus to any component that is linked to it (commonly known as Target Access). By this way the code of the Packet Processor may also be downloaded to the Packet Processor 1 from the host through the PCI bus 25. The Packet Processor 1 further comprises FIFO storage components 60, 61, 62, and 63, for temporarily storing portions of the data flow, a control and timing unit 65 for timing and synchronizing the operation of the Packet Processor, in particular the allocation of the transmit data slot, and some external interfaces 66 for communicating with components and devices external to the Packet Processor.

Figure 4:
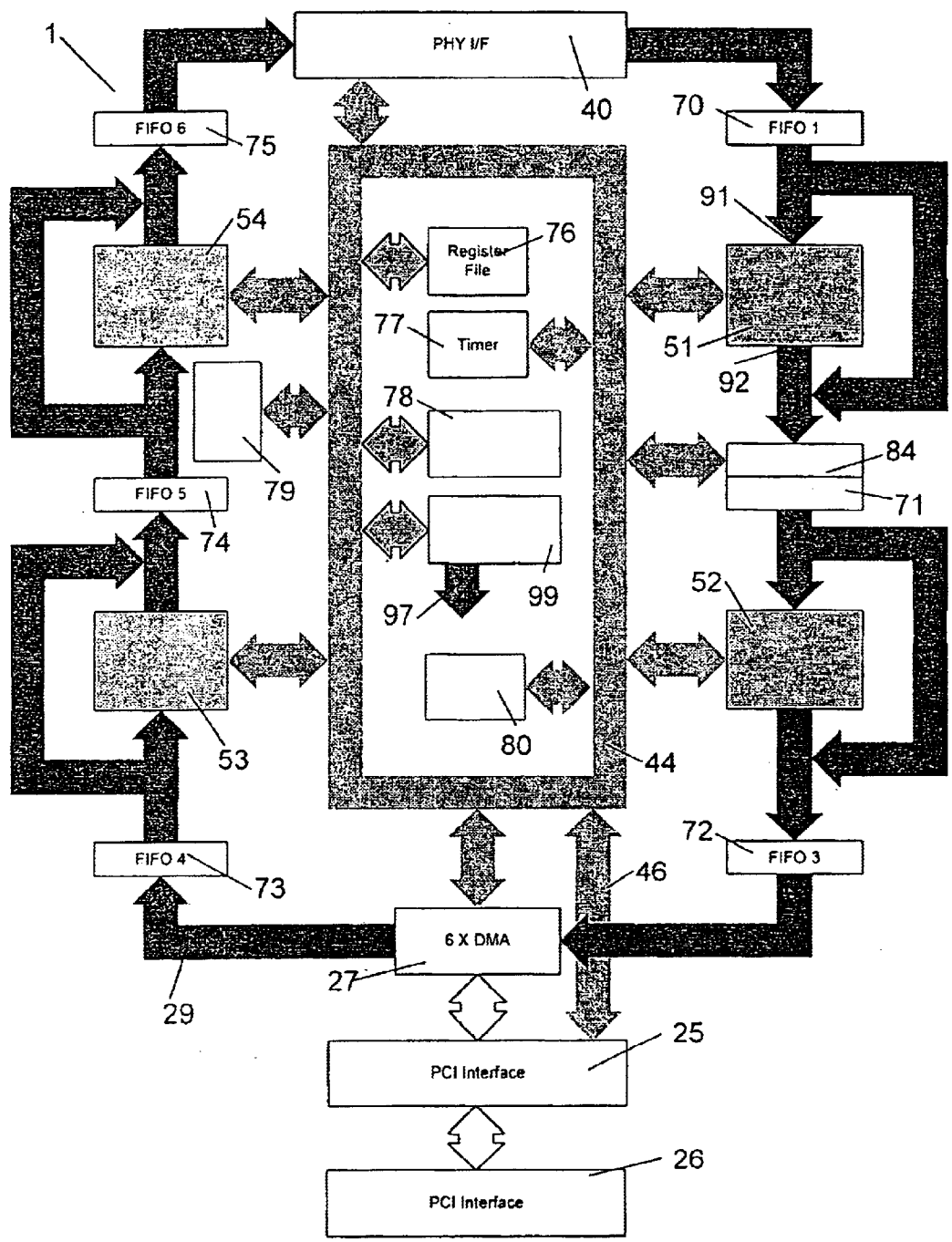
FIG. 4 shows a structure of a packet processor according to another embodiment of the invention.

FIG. 4 depicts in even more detail the structure of the Packet Processor, according to one embodiment of the invention. As said, the receiving and the transmitting parts 21 and 22 preferably comprise at least two processing-units each. When two or more processing-units are used in each part, the performance of the Packet Processor is significantly improved. In the embodiment of FIG. 4, the receiving part comprises a processing-unit-1 51, and a processing-unit-2 52, and the transmitting unit comprises processing-unit-3 53, and processing-unit-4, 54. The width of the Tubular Bus of the Packet Processor of FIG. 4 is 9 data bits, and the width of the Backbone Bus is 32 data bits.

In the embodiment of FIG. 4, the received data is preferably processed in two phases. The first phase, done by Processing-unit-1 51, includes the processing of the header 16 bit CRC and the deframing of the data stream, while the second phase, done by Processing-unit-2 52, includes the handling of the main 32 bit CRC of the packet payload, decryption, logical analysis including determining the length and type of the packets (management, or data), possible concatenation of packets and other related activities. The transmitted data is preferably processed in two phases. The first phase, done by Processing-unit-3 53, includes the handling of the creation of the header 16 bit CRC, controlling transmission opportunities, and prioritizing the transmission sequences, and other activities related to the transmit time allocation. The second phase done by processing-unit-4 54 includes the creation of the main 32 bit CRC, encryption, and framing of the transmitted data.

It should be noted here that the above allocation of tasks to the specific processing-units of the Packet Processor 1 is optional, although preferable, as the Packet Processor is programmable, and the code according to the invention is downloaded to the memory from an external source (not shown). Modifications to the code can be made at any time, and such modifications may change the allocation of the tasks to specific processing units.

Preferably, each of the four processing-units in the embodiment of FIG. 4 comprises a RISC-type (Reduced Instruction Set Computer) processor. The use of a RISC processor in the processing unit is preferable, due to its fast processing rate, simple structure, small silicon area, and flexibility of operation. Each processing unit also comprises an internal memory, which in turn is divided into a Scratch PAD RAM Memory (hereinafter, "SCRAM") and an instruction cache (ICACHE) memory. The RISC processing-units of the embodiment of FIG. 4 are characterized by having a separate access to three buses: A first, input bus 91, to the RISC processing-unit is mainly used for receiving the data flow from a FIFO in the Tubular Bus. A second, output bus 92 of each RISC processing-unit is mostly used for outputting the processed data from the processing-unit to the Tubular Bus. The third bus 93 of the processing-unit is bidirectional, and is used by the RISC processing-unit to gain access to the Backbone Bus 44, in order, for example, to communicate with internal or external peripheral components, or to load or download data and instructions from the external main memory to the internal memory of the processing unit, i.e., the SCRAM and the cache memory. The communication of the RISC processing-units with the peripheral components via the Ring Bus 44 is used, among other purposes, for controlling the process of the downloading of the code to the memory of the Packet Processor, or for debugging purposes, etc.

As shown in FIG. 4, the Packet Processor of the invention also comprises several FIFO storage elements 70, 71, 72, 73, 74 and 75. The purpose of the FIFOs is to provide a sequential temporary storage for portions of the data flow, before or after being processed by the respective processing-units of the Packet Processor. The said FIFOs enable each of the processing-units to sequentially process a flow of data, and to process and carry out operations on a portion of the data flow which is conveyed to it from a FIFO, while eliminating data loss.

Each FIFO of the Packet Processor 1 is basically a RAM block for storing a plurality of words of data, with the addition of some logic surrounding it. The structure of all the FIFOs of the Packet Processor, 70, 71, 72, 73, 74, and 75, is generally identical, but the RAM block size may differ from one specific FIFO to another. For example, according to one implementation of the invention, the size of the RAM block in different FIFOs ranges between 32 to 64 words of 9 bits. The FIFO sequentially receives words of data or macro-instructions from the Tubular Bus. The macro instructions are instructions that are originated, for example, by a processing unit, PHY interface, the DMA, etc., embedded with the data stream in the tubular bus, and used for controlling, e.g., the FIFOs, the Address Filter, etc. The macro instructions are discussed in more detail hereinafter. The words of data are then stored in the RAM block of the FIFO. The logic circuitry that surrounds the RAM block handles the progression of the words in the FIFO from the FIFO input to its output, and eliminates inputting of new words of data when the FIFO is full, or outputting a data word from it when the FIFO is empty or the processing-unit which should receive it is busy. FIFO 71, the second FIFO downstream the receiving path functions in combination with an Address Filter 84. The Address Filter 82 comprises a table of addresses. When an address is detected in a header of the data stream, a simultaneous comparison is made with all entries of this table. According to the result of the comparison, a decision is made whether the next data should be forwarded for a further processing or whether the data should be ignored. An ignoring of data may occur, for example, when the destination of this data is different from the one the packet processor operates.

The Packet Processor 1 further comprises a timer 77, which administers the operation of the module by providing numerous clock and control signals to the different components of the Packet Processor. In particular, it also controls the essential task of slot timing assignments associated with the transmit path a task which is well defined in the relevant protocol standards, and is familiar to those skilled in the art. The bus arbiter 79 administers the use of the Backbone Bus by different components at different times, according to some hierarchy rules and priority considerations. The ICU (Interrupt Central Unit) 80 administers the functioning of the interrupts of the Packet Processor.

Furthermore, several of other interfaces, generally indicated herein as External Interface block 78, are also included in the Packet Processor of the invention for communicating with other peripherals external to the module. For example, the module comprises a serial interface, preferably programmable, capable of implementing standards such as I²C (Inter-Integrated Circuit) standard, a JTAG (Joint Test Action Group, IEEE Standard 1149.1-1990) interface, etc. Each of the said interfaces handles communications between different types of peripheral components, and components of the Packet Processor via the Backbone-Bus. The External Bus Arbiter 99 is used for arbitrating the usage of the external bus 97, which used for accessing external memory. One application of such memory is the downloading of the application code by which the module operates from, (typically stored in an external storage means such as a diskette, a PROM, RAM, etc.), to the memory via the External Bus 97.

Figure 5:
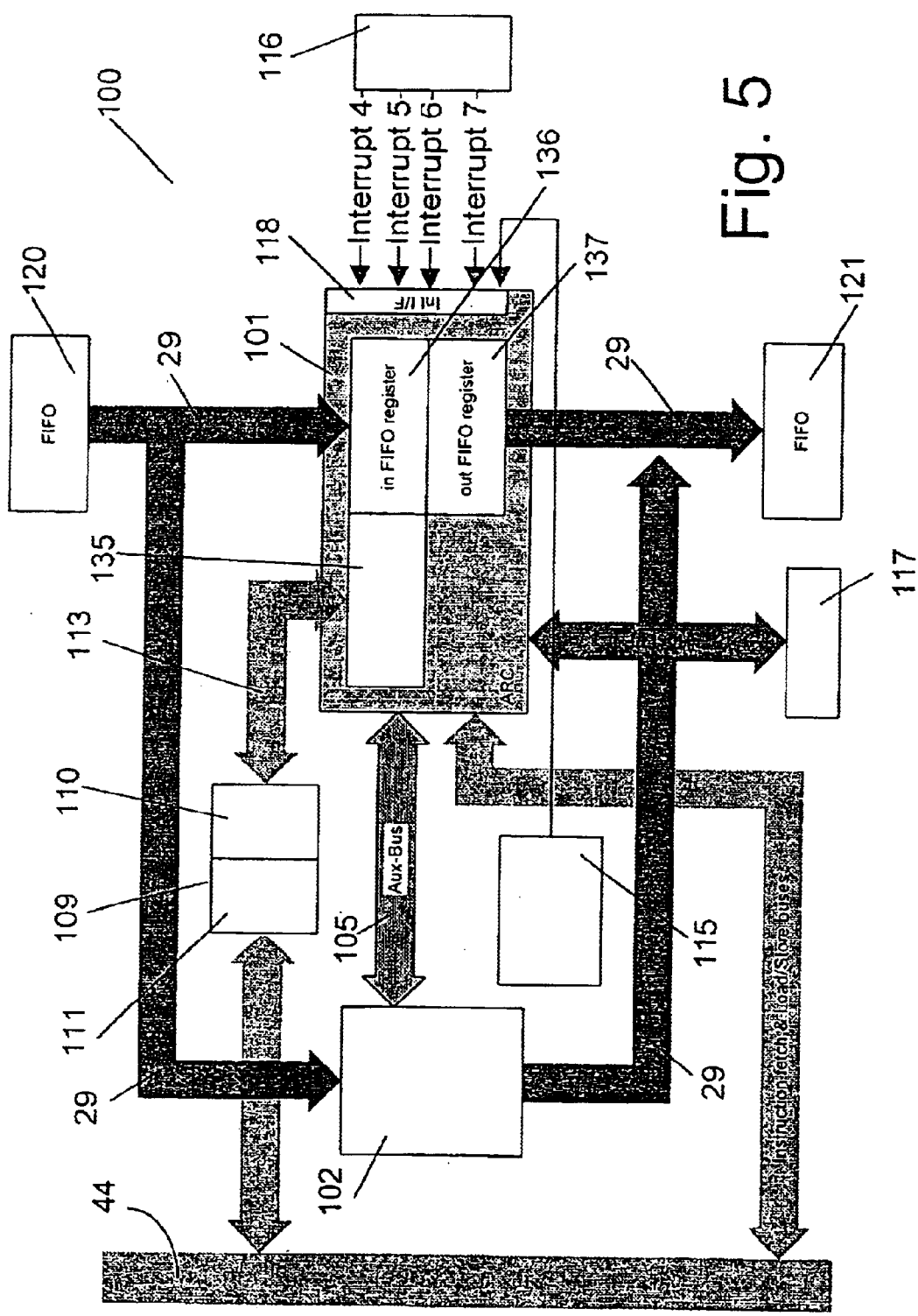
FIG. 5 shows a structure of one processing unit in the packet processor of FIG. 4.

The four processing-units 51, 52, 53, and 54 of the Packet Processor, have essentially the same structure according to the invention. However, in some cases, one or more may differ from the others, in view of the specific tasks that the processing units handle. FIG. 5 depicts the structure of a preferred processing-unit, according to one embodiment of the invention. The processing-unit 100 comprises two main components, a RISC processor 101, and a co-processor 102. The use of a RISC processor is preferable in this case, as it is characterized by having a reduced instruction set, that enables the processor to have a small silicon area, and to function in very short cycles. The number of the various tasks that are performed by processor 101 of the processing unit are few and repetitive, so an RISC processor can perform these tasks most efficiently, particularly in association with co-processor 102. In the embodiment of FIG. 5, an ARC (by ARC Cores Ltd.) type RISC processor, has been selected and found preferable, as it has separate input/output buses for the data flow, and for the fetching of instructions. The internal memory 109 of the processing unit 100 comprises an instruction cache memory section 110, preferably of the SRAM type, and a Dual Port Scratch Pad RAM 111. The Scratch Pad RAM 111 is loaded with data from the main memory unit via the Backbone Bus 44. The data in the internal memory 109 is generally sufficient for the operation of the processing unit, but when necessary, data is exchanged between the internal memory and the external memory via the Backbone Bus 44, the External Bus Arbiter 99, and the External Bus 97. The processor 101 itself communicates with the internal memory 109 via the Memory Bus 113. In order to improve the overall efficiency, some of the specific tasks of the processing unit are performed by the co-processor 102, with the supervision and control of processor 101. The communication between processor 101 and the co-processor is made via the Auxiliary Bus 105, having a width of preferably 32 data bits. The processing unit 100 also comprises a clock unit 115, an Interrupt Control Unit 116, and optionally, a Debug Interface Unit 117. The Interrupt Control unit 116, which is a part of the ICU 80 of FIG. 4, provides interrupts to the Interrupt Interface 118 of processor 101, when necessary. The two FIFO storage units at the input and the output of the processing unit are indicated herein as numerals 120 and 121, respectively. These FIFOs are, in the case of processing unit 52, FIFO-2 71, and FIFO-3, 72.

The RISC processor 101 has several internal registers other than the internal register files (not shown). The main registers of the RISC processor are, the RAM Access Registers 135 for temporarily storing data to/from the internal memory 109, an In FIFO Register 136, and an Out FIFO Register 137.

Figure 6:
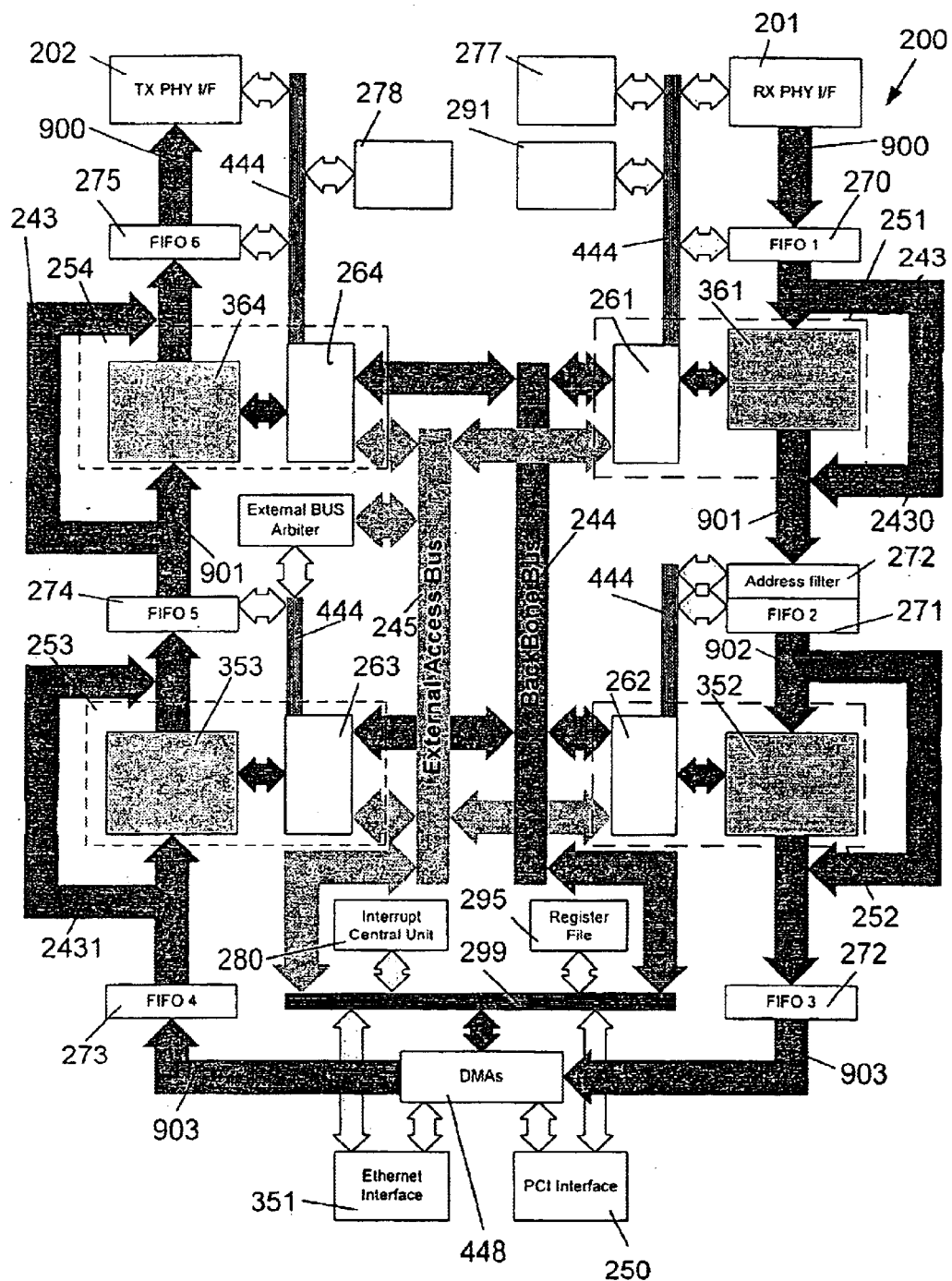
FIG. 6 shows a structure of a packet processor, according to still another embodiment of the invention.

FIG. 6 shows the structure of a Packet Processor according to a more preferred embodiment of the invention. The Packet Processor of FIGS. 3, 4, and 5 comprises two main buses, a Tubular Bus 29, and a Backbone Bus 44. Whenever one of the processing units needs an instruction that is not in the cache memory section 110, or a memory data that is not in the Dual Port Scratch Pad RAM 111, an access is made into the external memory unit, in order to load the internal memory 109 (the cache memory section 110, or the Dual Port Scratch Pad RAM 111) with said missing content. The communication with the external memory unit is carried out by any processing unit via the Backbone Bus 44, the External Bus Arbiter 99 and the External Bus 97. However, this configuration suffers from the drawback that any access to the main memory unit eliminates simultaneous use of the Backbone Bus, which, consequently, slows the operation of the module.

The Packet Processor of FIG. 6 overcomes this drawback by having three main buses, a Tubular Bus 243, a Backbone Bus 244, and an External Access Bus 245. In this structure, simultaneous activities can be carried out in the External Access Bus, and in the Backbone Bus, eliminating the need, for example, to disable activity on the Backbone Bus 244 while a processing unit accesses the main memory.

The peripheral bus 444 is a memory mapped local bus through which each processor communicates mainly with its associated coprocessor (primarily for command and control of operational modes), and with its immediate peripherals.

The usage of the peripheral buses 444, which are internal buses of the processing units, is to reduce transactions through the backbone bus 244, and to make it be available to other processors.

The Tubular Bus 242 is preferably a 9-bit bus, and the Backbone Bus 244 and the External Access Bus 245 are preferably buses of 32-bits.

The Packet Processor of FIG. 6 comprises, as before, four processing units, two processing units 251, 252 in the receiving part, and two processing units 253, and 254 in the transmitting part. The Tubular Bus 243 is actually divided into two separate buses, the receiving Tubular Bus 2430 of the receiving part, and a Tubular Bus 2431 of the transmitting part. As before, through the receiving Tubular Bus 2430 the received data from the demodulator of the modem flows, while being processed, to the host, and through the transmitting Tubular Bus 2431, a transmitted data flows, while being processed, from the host to the modulator of the modem. Of course, as before, the modulator and the demodulator are parts of the modulator-demodulator unit of the modem (not indicated in this figure). The communication of the Packet Processor with the modulator-demodulator is carried out via the PHY interface, which comprises two separate portions, a receiving PHY interface 201, and a transmitting PHY interface 202. The bidirectional communication between the Tubular Bus of the Packet Processor and a host, is made via a PCI interface 250. Alternatively, a bidirectional communication between the Tubular Bus of the Packet Processor and one of a plurality of hosts that are connected to a local network may be carried out via an Ethernet interface 351. Such communication involves the transfer of data that has to be processed by the Packet Processor and then transmitted by the modulator, or data that has been received by the Packet Processor from the demodulator, processed, and then transferred to a host. Timer 277 provides control and timing signals to different components of the module, but primarily controlling timings related to the transmit path operations. The optional Debug Interface Unit 291 enables the debugging of the module. It is shown as operating in conjunction with processing unit-1 251, however, it may work with other processing units of the module, as well. The Interrupt Central Unit 280 administers the interrupts to different components of the module, as needed.

The local host interface bus 299 reduces the load of the Backbone and the External buses 244 and 245 respectively, by enabling local access to the PCI Interface 250, Ethernet Interface 351, Interrupt Control Unit 280 and Register File 295 while freeing the Backbone and the External buses for other concurrent tasks.

The Packet Processor of FIG. 6 optionally further comprises a Serial Interface 278, for providing serial communication of the Packet Processor with any external serial device or component, however, it is optional.

As said, the Packet Processor of FIG. 6 comprises four processing units, 251, 252, 254, and 255. The received data is preferably processed in two phases. The first phase, done by Processing-unit-1 251, includes the processing of the header 16 bit CRC and the deframing of the data stream, while the second phase, done by Processing-unit-2 252, includes the handling of the main 32 bit CRC of the packet payload, decryption, logical analysis including determining the length and type of the packets (management, or data), possible concatenation of packets and other related activities. The transmitted data is preferably processed in two phases. The first phase, done by Processing-unit-3 253, includes the handling of the creation of the header 16 bit CRC, timing, controlling allocation, and prioritizing the transmission sequences, and other activities related to the transmit time allocation. The second phase done by processing-unit-4 254 includes the creation of the main CRC, encryption, and framing of the transmitted data.

The register file 295 comprises additional external registers for optional use by any of the processing units.

As in the embodiment of FIGS. 4 and 5, the four processing units of the Packet Processor of FIG. 6 have essentially the same structure. However, this is not a limitation, and each processing unit may have a specific structure, which is most suitable for the task it handles. Each of the processing units of the Packet Processor of FIG. 6 mainly comprises a processor and co-processor, and a Sub-Unit Controller (SUC). In the processing unit 251, the processor 1 and its associated co-processor, are indicated as block 361, and the sub-unit controller is indicated as block 261; in the processing unit 252, the processor-2 and its associated co-processor are indicated as block 352, and the Sub-Unit Controller is indicated as block 262; in the processing unit 253, the processor-3 and its associated coprocessor are indicated as block 353, and the Sub-Unit Controller is indicated as block 263; and in the processing unit 254, the processor-4 and its associated co-processor are indicated as block 364, and the Sub-Unit Controller is indicated as block 264. Each processor and its associated co-processor of any of the said processing units handle a specific task, while the SUC of that unit (261, 262, 263 or 264) handles the communication of the unit with the Backbone Bus (BB) 244, and the External Bus (EB) 245. Preferably, also in the embodiment of FIG. 6, the processors are preferably RISC type processors, as such processors are capable of performing relatively simple tasks using small silicon area, in a very rapid manner.

Figure 7:
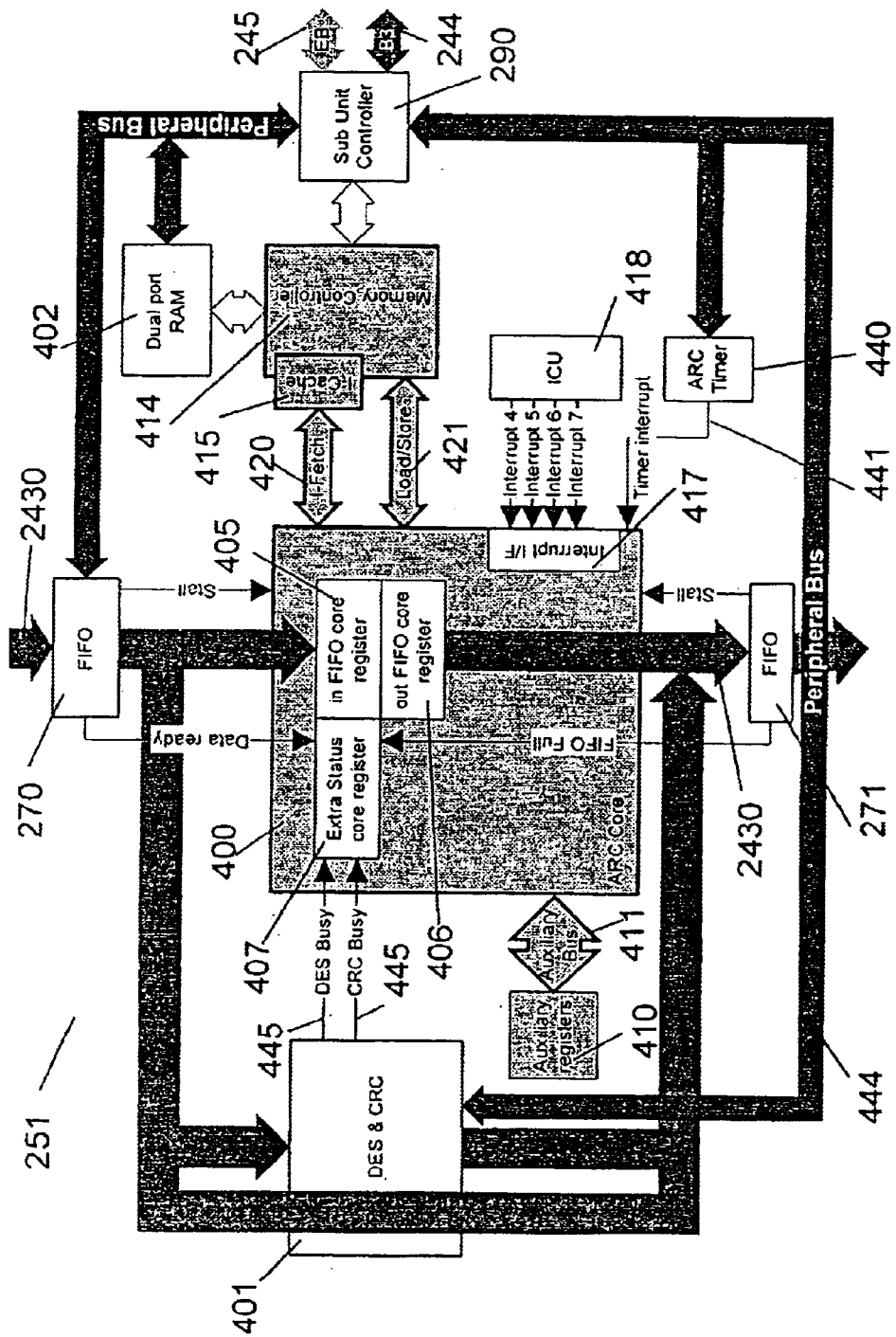
FIG. 7 shows a structure of one processing unit in the packet processor of FIG. 6.

The structure of processing unit 251 of the Packet Processor of FIG. 6 is shown in FIG. 7. The other three processing units of the Packet Processor have essentially the same structure. The processing unit comprises three main components, a processor-1 400, a coprocessor-1 401, and an internal memory unit 402. As said, processor-1 is preferably of a RISC type processor, more preferably of the type known as ARC (by ARC cores, Ltd.). Processor 400 receives data from the Tubular Bus 2430, more particularly from FIFO 270, into its IN FIFO REGISTER 405. The processor 400 and the coprocessor 401 have each access to the tubular bus. While processor 400 performs mainly operations which are related to the logical analysis including determining the length and type of the packets (management, or data), possible concatenation of packets (in the receiving path) or timing, controlling allocation, and prioritizing the transmission sequences in the transmitting path, and framing or deframing of the data stream, coprocessor 401 do mainly specific tasks, i.e., carrying out the DES and or the CRC. Such tasks are carried out independently by the coprocessor, under the supervision of the processor 400, providing to the coprocessor control signals. When necessary, the processor 400 communicates data that it receives from the Tubular Bus into the coprocessor 401 via the peripheral bus 444 for further processing, or in some cases, when the processor detects that there is no need for any processing in any specific data portion, it allows that data from the Tubular Bus to bypass the processing unit and to be conveyed directly from FIFO-1 270 into FIFO-2 271. This frees the processor to perform higher layer tasks that are not directly related to the data stream. Data that is processed by the processor 400 is conveyed from the Out FIFO Register 406 via the Tubular Bus 2430 into FIFO-2 271. The peripheral bus 444 is is used by processor 400 to communicate mainly with the coprocessor 401 (primarily for command and control of operational modes), and with the immediate peripherals, like timer 440, the dual port RAM 402 etc. The communication from the processor 400 to the peripheral bus is made through the memory controller 414. The DES Busy and CRC busy status lines 445 and 446 respectively are used by the coprocessor 401 to indicate to the processor 400 its being in a busy state. The processor further comprises an extra Status Core register 407, and it also communicates with auxiliary registers 410 via an auxiliary bus 411, which is also an option of the ARC processor. The auxiliary registers, each contain a word which is used for configuration purposes, such as the cache size, the processor 400 ID, etc. The memory of the processing unit comprises three memory sections, an instruction cache memory 415, a dual port SCRAM 402, and an external memory unit. It has been found that with an instruction cache size of 4K bytes, a relatively high hit rate of well above 90% can be achieved by a Packet Processor according to the invention, operating as a media access control (MAC) module of a modem. A memory controller 414 controls the communication between the processor 400 and all said sections of the memory. The Instruction Fetch Bus 420 is used by the processor 400 for fetching instructions, and the Load/Store Bus 421 is used for connecting the processor with all peripherals through the Backbone Bus. Specifically, it allows the Load/Store access to the internal SCRAM 402, and the external memory. The communication between the memory controller and the external memory is made through the Sub-Unit Controller 290 over the External Bus 245. The downloading of the internal memory and the cache sections is carried out from a device external to the Packet Processor, via the External Bus 245, the Sub-Unit Controller 290, and the memory controller 414. The Sub-Unit Controller 290 also regulates all kinds of data transfer between the processing unit 251, and the Backbone Bus 244 or the External Bus 245. The processor 400 of the invention also comprises an internal interrupt interface 417, for handling interruptions. Four hardware interrupt lines are provided from the Interrupt Control Unit 418 to the processor 400. The ARC timer 440 provides a timing clock 441 to the processor 400, and optionally also to other components of the processing unit. More particularly, it serves as a timeout counter, and a real-time clock.

In order to accelerate the data transfer between components inside the Packet Processor or external thereof, the Packet Processor of the invention is also provided with a DMA (Direct Memory Addressing) controller 448 (FIG. 6) that can enable various of DMA channels. Each channel can transfer a block of data from one bus or interface to another bus or interface. A DMA channel transfer can be initiated by a processor of a processing unit, or optionally by another controller or interface that has been defined to have that option. Each channel supports a data chaining using a memory located block of data. The DMA channels are divided into three main data transfer types:

1. A general bidirectional channel for data transfer between:
   (a) The PCI Bus and the Backbone Bus or the External Bus.
   (b) The Backbone Bus or the External Bus bus and the Ethernet.
   (c) PCI bus and the Ethernet.

2. A unidirectional channel in the received path for data transfer:
   (a) From the Tubular Bus to the PCI bus.
   (b) From the Tubular Bus to the Ethernet.
   (c) From the Tubular Bus to the Backbone Bus or the External Bus.

3. A unidirectional channel in the transmitted path for data transfer:
   (a) From the PCI Bus to the Tubular Bus.
   (b) From the Ethernet to the Tubular Bus.
   (c) From the Backbone Bus or the External Bus to the Tubular Bus.

As said, it is highly advantageous to have at least two processing units in each one of the transmit part and the receive parts of the Packet Processor of the invention. It has been found that the use of a single processing unit in each of said parts, although possible, requires a very powerful processor in the processing unit. The sharing of tasks between two processing units in each part significantly improves the rate and the performance of the Packet Processor. In that case, many tasks can be performed simultaneously by the two processing units in each part. The architecture of this invention is scalable, allowing the use of more than two processing units in each part may improve even more the performance of the Packet Processor. However, the rate of that improvement may be less than is achieved by the introduction of the second processing unit in each part, due to a possible loading of the internal buses.

In many broadband networks the modem may receive data that is actually targeted to another modem. Frequently, such data may be a very large portion of the total data that modems in said networks receive. This is the case, for example, in modems for TV cables. In that case, the modem has to determine whether the data is actually addressed to it or not, or in other words, whether to ignore portions of the data it receives or not. This can be determined only at the packet level, from the section of the packet indicating the destination address. For that purpose, the Packet Processor of the invention preferably further comprises an address filter 272. The address filter according to the invention is located on the Tubular Bus of the receiving part between the first processing unit 251 and FIFO 2 271. It receives packets from Processing Unit-1 251, and it filters out any packet that should be ignored by the Packet Processor. By doing so, it lowers the workload from the entire receive path by dumping any packet received with an address that does not appear in a list of addresses existing in that filter 272. In a particular case when the Packet Processor is used as a MAC module for a modem for TV cables, the list of addresses contains, for example, a set of 16 addresses, each of which is 48 bits wide. All 16 addresses are treated as unicast, i.e. the address filter looks for an exact match between the incoming address and at least one address from the address memory. Each address can be marked as "invalid". The address filter drops from further processing any packet causing a hit on an "invalid" address.

Of course, the data flowing along the Tubular Bus has a different structure in different sections of the Tubular Bus. According to the embodiment of FIG. 6, the following data structure exists in the indicated sections of the Tubular Bus in FIG. 6:

| Section No. | Data Structure |
| --- | --- |
| 900 | Bytes stream with PHY commands |
| 901 | MAC frames stream |
| 902 | Filtered MAC frame stream |
| 903 | Byte stream with DMA management commands |

The structure of the Packet Processor of the invention enables performing the required tasks at a very high rate. The Packet Processor of the invention, although suggested herein as an example to be used as a MAC module of modem, is a general purpose and programmable, as its code can be downloaded from an external source. Therefore, working with the module of the invention is flexible, as it can easily adapt to changes in standards, or data rates. The adaptation of the module to such changes can be simply effected by the modification of the downloaded code.

The Packet Processor also preferably employs the concept of Inband Macro-instructions, where the control of the various blocks and co-processors is accomplished by means of Macro-instructions (MIs). The macro-instructions are the in-band commands which are passed between the different Packet Processor components and are embedded in the data stream flowing through the tubular bus. Preferably, the macro-instructions are distinguished from the data by the value of the 9th bit ("1" means Macro-instruction and "0" means data).

The macro-instructions are used to allow control and "message" passing from one unit to another with the ability to keep the close relationship to the data stream. This mechanism allows the Packet Processor to comprise minimum asynchronous signals between the units and to synchronize the data related signals with the data itself, while using FIFOs and buses between the units.

The MIs are generally known to all the components of the Packet Processor. Each component recognizes several MIs and ignores the rest.

According to one embodiment of the invention, each data word in the Packet Processor consists of 9 bits. If the 9th bit is '0'—this word is a data word and is treated as such. If the 9th bit is '1'—this word is a macro-instruction. The structure of the MI depends on the MI group to which it belongs. Given below is an example of some MIs, their codes, functions and structures. The following Table 1 depicts the global and software groups MIs.

TABLE 1

| 8 | 7 6 | 5 0 |
|---|---|---|
| MI Indicator | MI Group | Specific MI code |

The following Table 2 defines the MI group codes:

TABLE 2

| Group Name | Code |
|---|---|
| Software | '00' |
| General | '10' |
| FIFO | '01' |
| Address Filter | '11' |

TABLE 3

MI codes of the general group

| MI Name | Code | Description |
|---|---|---|
| MI_ABORT | 180 | Abort operation and restart internal state machine. |
| MI_PACKET_START | 181 | Indicating that the next byte is the first byte of a packet. |
| MI_PACKET_END | 182 | Indicating that the previous byte was the last byte of a packet. |
| MI_FRAME_FLUSH | 183 | Ignore the current frame. |

TABLE 4

MI of the FIFO group

| MI Name | Code | Description |
|---|---|---|
| MI_FIFO_FLUSH | 160 | Command to the FIFO to flush itself. |

TABLE 5

MI of the Adress Filter

| MI Name | Code | Description |
|---|---|---|
| MI_ADDR_START | 1C1 | Instruct the AF (address filter) to start the checking the address from the next byte. |
| MI_ADDR_END | 1C0 | Notifies the AF that the previous byte was the last address byte. |
| MI_ADDR_MISS | 1C2 | A macro instruction issued by the AF notifies the next units on the T-Bus that the address filter did not find an address that matches the last received address. If this occurs the AF stops forwarding data to the T-Bus until the next MI_PACKET_START is received from the T-Bus. |
| MI_ADDR_HIT | 1C4 | A macro instruction issued by the AF notifies the next units on the T-Bus that the address filter found an address that matched the last received address. If this occurs the AF continues to forward data to the T-Bus. |

Of course, the description above has disclosed only the general structure of the Packet Processor of the invention, which is suitable, for example, to be used in modems for TV cables. The Packet Processor naturally contains other signals and controls that have not been disclosed herein for the sake of brevity. These additional signals are known, and can be easily developed by those skilled in the art. Furthermore, the Packet Processor of the invention can be easily reduced and manufactured in a VLSI form, a preferable form of the Packet Processor of the invention.

The performance of the module is best when its tasks are divided between the processing units according to the Venturi Pipe model.

The Ventuti Pipe model describes a general data communication system, which receives information from a physical layer and transmits information into a physical layer.

The Ventuti Pipe, as is known from classical fluid theory, is a variable diameter pipe. When fluid is injected into the pipe, its tangential velocity is higher in the narrow part, and slower in the wider part. The dM/dt, i.e., the mass flow ratio is naturally kept equal along the pipe, while the same mass of fluid which flows into the pipe must flow out. The Bernoulli law of fluid flow describes the phenomena wherein the pressure on the pipe walls decreases, as the velocity of the fluid increases: low pressure at the narrow part and high pressure at the wide part.

The analogy to a communication system is as follows: The ends of the pipe describe the input and output streams of the communication system, which are close to the physical layer. The symbol or bit stream at the physical layer level is very high, making the latency cycle required to process the information very short and time-sensitive. As the information is decoded, built into complex streams or packets and deciphered for contents, the size of the information element increases, and at the same time, the information transfer rate is slower. At these stages, the complexity of the processing level increases more and more.

Virtual division of the pipe into layers, describing the various information elements as they are formed, makes the continuous pipe a Layered Ventuti Pipe Model for information flow.

Back layers (or group of layers) of information can use a dedicated processor for flow processing. The instructions used by this processor are suitable for the contents and format of the flow at that layer, according to the specific communication protocol and content. At the far sides of the Ventuti Pipe, the processing units can be very small and simple, dedicated processors. The deeper we get into the pipe (i.e., in our case the Tubular Bus), the more complex the processors must become, in order to support more computational instructions and to perform a longer series of instructions.

In many cases it is impossible to implement a complete communication device with a single, powerful processor. Although the total processing power is measured in total system MIPS, the real-time requirements of the various levels make it a very challenging burden to manage various tasks from within a single processor, executing a single task at a time. It is sufficient to have two of the layers, both requiring immediate processing within the same short time slot, to make performing the complete task very difficult. When the processing task is divided among several processors as in the MAC module of the invention, each running independently, there will be no mutual timing constraints. Furthermore, each change requirement in one of the levels would in most cases not interfere with the other level, making the complete platform very easy to manage and flexible to programming changes.

In the case of the Packet Processor of the invention, there is at least one processing unit in each of the receiving and the transmitting parts 23 and 24, respectively. However, in order to comply and exploit the advantages of the Ventury Pipe Model, the Packet Processor of the invention preferably comprises at least two processing units in each of said two parts. In that case, processing unit-1 51 and processing unit-4 53 perform simple tasks on small units of data at a very high rate, while processing unit-2 52 and processing unit-3 54 perform more complicated tasks on larger units of data at a slower rate.

In order to optimally utilize the Packet Processor of the invention, according to the above described Venturi Pipe model, there are several options for selecting the processing units:

1) Identical standard processors: this is the simplest option. It is however, the least optimal, as it does not comply with the Venturi model, which, as said, is based on the principle that different processors in the task chain do tasks of varying complexity. Therefore, the processing units should preferably not be the same.

2) Dedicated non-standard processors: using a different type of processor at each stage in the task pipe is probably the most optimal in terms of silicon size, but the most complex in terms of the development environment: tools (compilers, assemblers, debuggers) are needed to be developed for each dedicated processor.

3) Parametrizable standard processors: This is generally the optimal solution, as it combines the best of all worlds: standard development environment for all processors, and reasonably small silicon area. Such a processor is the ARC RISC microprocessor that can be parametrized in both the hardware and the Instruction Set (different cache size, different functional blocks such as muliply/accumulate, barrel shifters). This selection allows the use of a same development tools for all the processors in the task pipe, while the processors differ in their specific composition according to their location in the task pipe.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A Packet Processor for a communication apparatus, for processing received and transmitted data streams made of packets, each packet mainly comprises a header and a payload section, comprising:

(A) A receiving part comprising:
   (a) A receiving PHY interface by which a flow of data stream is conveyed from a Modulator-Demodulator section of a modem to the Packet Processor;
   (b) A receiving Tubular Bus receiving the said flow of data stream which is conveyed from the Modulator-Demodulator section of the modem to the Packet Processor, said receiving Tubular Bus conveying data, while processed, in the direction from the said receiving PHY interface to a host interface;
   (c) At least one processing unit between sections of the said receiving Tubular Bus for sequentially receiving portions of a data stream from a section of the receiving Tubular Bus, processing the same, and outputting the processed data to a next section of the said receiving Tubular Bus;
   (d) One FIFO storage unit before and one FIFO storage unit after any of the said processing units on the receiving Tubular Bus, for providing a temporary storage for portions of the data stream; and
   (e) A first host interface for receiving data from the receiving Tubular Bus and conveying it to a host;

(B) A transmitting part comprising:
   (f) A second host interface for receiving data from the host and conveying it to:
   (g) A transmitting Tubular Bus for receiving the said flow of data stream which is conveyed from the host to the Packet Processor, said transmitting Tubular Bus conveying the data stream, while processed, in the direction from the said second host interface to a transmitting PHY interface;
   (h) At least one processing unit between sections of the said transmitting Tubular Bus, for sequentially receiving portions of the data stream from a section of the transmitting Tubular Bus, processing the same, and outputting the processed data to the next section of the said transmitting Tubular Bus;
   (i) One FIFO storage unit before and one FIFO storage unit after any of the said processing units on the transmitting Tubular Bus, for providing a temporary storage for portions of the data stream; and
   (j) A transmitting PHY interface for receiving processed data from the transmitting Tubular Bus and conveying the same to a Modulator-Demodulator section;

(C) A Backbone Bus for conveying management data, instructions, and addresses between various components of the Packet Processor; and (D) Timing and control means for administering the operation of the Packet Processor, and particularly the timing of using transmission slots for the transmit path.

2. A Packet Processor according to claim 1, wherein each one of the processing units in the module functions independently, but simultaneously, with the other processing units of the module.

3. A Packet Processor according to claim 1, comprising two processing units in the receiving part and two processing units in the transmitting part.

4. A Packet Processor according to claim 3, wherein, in the receiving part, the processing unit closer to the demodulator handles the tasks of mainly processing the header, deframing the data stream, and detecting and correcting errors in the header of the received data stream. The processing unit closer to the host, mainly handles the tasks of logical analysis, including determining the length and type of the packets (management, or data), possible concatenation of packets, decrypting the received data stream, and error detecting and correcting of the data portion of the data stream, in the transmitting part, the processing unit closer to the host mainly handles the task of controlling allocation, and prioritizing the transmission sequences, and activities related to the creation of the header CRC of the transmitted data stream, the processing unit closer to the modem mainly handles the task of the creation of the main CRC, encription, and framing of the transmitted data.

5. A Packet Processor according to claim 1, wherein each processing unit comprises a processor and at least one co-processor.

6. A Packet Processor according to claim 1, wherein each processing unit also comprises an internal memory.

7. A Packet Processor according to claim 6, wherein the internal memory of each processing unit includes an instruction cache memory and a Scratch Pad RAM.

8. A Packet Processor according to claim 1, further comprising a connection to an external memory unit.

9. A Packet Processor module according to claim 1, wherein the communication with the external memory unit is made by a processing unit of the packet processor, via the Backbone Bus, and an external bus arbiter.

10. A Packet Processor according to claim 1, wherein each of the FIFO units comprises a plurality of memory cells for providing a sequential temporary storage for portions of the data stream.

11. A Packet Processor according to claim 1, further comprising a connection to one or more external devices.

12. A Packet Processor according to claim 11, wherein one of said devices is a storage unit, containing a code for operating the processor, said code being downloaded into the internal memory of each processing unit of the packet processor, and into said external memory unit when initializing the packet processor.

13. A Packet Processor according to claim 1, further comprising an External Bus for communication of the module with an external memory unit.

14. A Packet Processor according to claim 13, wherein the communication with the external memory unit is made by a processing unit of the packet processor, via the External Bus, and an external bus arbiter.

15. A Packet Processor according to claim 1, further comprising a debugging unit for assisting in the debugging of the packet processor.

16. A Packet Processor module according to claim 1, further comprising a DMA control unit for enabling internal transfer of data blocks between internal components of the packet processor, and transfer of data blocks between internal components of the packet processor and components external to the packet processor.

17. A Packet Processor according to claim 1 fabricated in a VLSI form.

18. A Packet Processor according to claim 1, further comprising a Serial Interface for carrying out communication of the module with external serial components.

19. A Packet Processor according to claim 1, further comprising an Interrupt Central Unit for handling interruptions to components in the module.

20. A Packet Processor according to claim 1 for use in communication apparatus.

21. A Packet Processor according to claim 20, wherein said communication apparatus is a modem.

22. A Packet Processor according to claim 20, wherein said communication apparatus is a modem for TV cables.

23. A Packet Processor according to claim 20, for use as a MAC module for a modem.

24. A Packet Processor according to claim 20, for use in a communication routers.

25. A Packet Processor according to claim 1, wherein each processing unit comprises means for embedding one or more macro-instruction with the data flowing in the tubular bus, said macro instruction flowing with the data over the tubular bus to a destination component downstream the tubular bus, and is used for controlling said component.

26. A Packet Processor according to claim 25 wherein the component in the tubular bus which is the destination of said macro-instruction is a FIFO.

27. A Packet Processor according to claim 1 wherein the second FIFO downstream the receiving bus is further associated with an address filter.

28. A Packet Processor according to claim 27 wherein the said address filter is used for comparing a destination address that is detected in the data stream with a list of addresses stored in said address filter, and according to the result of the comparison, determines whether an operation should be taken or not on at least a portion of the data stream.

29. A Packet Processor according to claim 27 wherein one operation that is taken based on said comparison is a flushing of the content of a FIFO and an ignoring of a portion of the data stream.

30. A Packet Processor according to claim 1 wherein each of the processing units of the transmitting and/or receiving parts is a RISC processor.

31. A Packet Processor according to claim 30 wherein each RISC processor of the transmitting and/or receiving parts is of an ARC type processor.

32. A packet processor according to claim 1, wherein the timing and control means are also used for administering the allocation of timing slots for the transmitted data stream.

33. A Packet Processor according to claim 1 wherein the first and second host interfaces are fabricated within a same interface.

34. A Packet Processor according to claim 1, for use in a modem for a wireless LAN.

35. A Packet Processor according to claim 1, for use in Internet Protocol telephone modems.

36. A Packet Processor according to claim 1 wherein the backbone bus is a ring type bus.

* * * * *

UNITED STATES PATENT AND TRADEMARK OFFICE
CERTIFICATE OF CORRECTION

PATENT NO. : 6,687,757 B1 Page 1 of 1
DATED : February 3, 2004
INVENTOR(S) : Ben Ze-ev et al.

It is certified that error appears in the above-identified patent and that said Letters Patent is hereby corrected as shown below:

<u>Title page, Item [54] and Column 1, line 1,</u>
Title, should be:
-- PACKET PROCESSOR FOR BROADBAND AND WIDE BAND COMMUNICATION SCHEMES --

<u>Title page,</u>
Item [30], please add:
-- [30]   Foreign Application Priority Data
July 5, 1999 (il)………………...…... 130796 --

Signed and Sealed this

Eighteenth Day of May, 2004

JON W. DUDAS
*Acting Director of the United States Patent and Trademark Office*